United States Patent [19]

Stiberth et al.

[11] Patent Number: 5,171,637

[45] Date of Patent: * Dec. 15, 1992

[54] TIRE CORD ADHESIVE LATEXES CONTAINING AMINO ACRYLATE POLYMERS

[75] Inventors: Lothar F. Stiberth, Copley; James R. Miller, Richfield; Sudhendra V. Hublikar, Olmsted Falls, all of Ohio

[73] Assignee: The Uniroyal Goodrich Tire Company, Akron, Ohio

[*] Notice: The portion of the term of this patent subsequent to Jul. 23, 2008 has been disclaimed.

[21] Appl. No.: 684,537

[22] Filed: Apr. 11, 1991

Related U.S. Application Data

[60] Division of Ser. No. 548,152, Jul. 5, 1990, Pat. No. 5,034,462, which is a continuation of Ser. No. 348,458, May 8, 1989, abandoned.

[51] Int. Cl.$^5$ .............................................. B32B 17/10
[52] U.S. Cl. ..................................... 428/436; 428/460; 428/475.8; 428/476.1; 428/483; 428/506; 428/532; 428/688; 523/201; 524/34; 524/424; 524/504; 524/509; 525/68; 525/139; 525/141

[58] Field of Search ............... 428/441, 460, 475.8, 428/483, 501, 688, 436, 476.1, 506, 532; 523/201; 524/34, 424, 504, 509; 525/68, 139, 141

[56] References Cited

U.S. PATENT DOCUMENTS

| | | | |
|---|---|---|---|
| 2,211,945 | 8/1940 | Church | 428/284 |
| 2,561,215 | 7/1951 | Mighton | 428/246 |
| 4,423,198 | 12/1983 | Tsai | 526/263 |
| 4,448,813 | 5/1984 | Solomon | 427/381 |
| 4,472,463 | 9/1984 | Solomon | 427/381 |
| 4,497,917 | 2/1985 | Upson et al. | 523/201 |
| 4,680,335 | 7/1987 | Chambers et al. | 524/501 |
| 4,751,277 | 6/1988 | Okuya et al. | 526/312 |
| 4,760,110 | 7/1988 | Das | 524/460 |

FOREIGN PATENT DOCUMENTS

2147303 5/1985 United Kingdom.

*Primary Examiner*—Joseph L. Schofer
*Assistant Examiner*—R. H. Delmendo
*Attorney, Agent, or Firm*—Laura F. Shunk; Alan A. Csontos

[57] ABSTRACT

These polymers are copolymers or overpolymers having a substrate of styrene butadiene copolymer overpolymerized with an amine substituted alkyl acrylate. The polymers promote adhesion between organic and inorganic substrates and unsaturated polymers.

11 Claims, No Drawings

TIRE CORD ADHESIVE LATEXES CONTAINING AMINO ACRYLATE POLYMERS

CROSS-REFERENCE

This is a division of application Ser. No. 07/548,152, filed Jul. 5, 1990, U.S. Pat. No. 5,034,462 which is a continuation of application Ser. No. 07/348,458, filed on May 8, 1989, abandoned, of Lothar F. Stiberth, James R. Miller and Sudhendra V. Hublikar, for "TIRE CORD ADHESIVE LATEXES CONTAINING AMINO ACRYLATE POLYMERS."

FIELD OF THE INVENTION

The present invention relates generally to copolymers or overpolymers of styrene-butadiene rubber and an amine substituted alkyl acrylate of the formula I

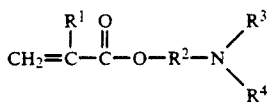

wherein $R^1$ is hydrogen, or alkyl having 1 to 4 carbon atoms, and preferably $R^1$ is hydrogen or methyl, and most preferably $R^1$ is methyl; $R^2$ is an alkyl having from 1 to 8 carbon atoms, and preferably 2 to 4 carbon atoms; and $R^3$ and $R^4$ are the same or different and are hydrogen, aliphatic having 1 to 8 carbon atoms, or aromatic or aliphatic substituted aromatic having 6 to 8 carbon atoms, or together with the nitrogen are heterocyclic having 3 to 8 carbon atoms, or oxygen, sulfur, and/or halogen derivatives of the same; and preferably $R^3$ and $R^4$ are hydrogen or aliphatic having 1 to 4 carbon atoms where one may be hydrogen but not both; and most preferably $R^3$ and $R^4$ are both ethyl, or $R^3$ is butyl and $R^4$ is hydrogen. These polymers are used as a latex in a resin formulation to promote adhesion between an organic substrate and an unsaturated binder such as a rubber. The polymers are made in an emulsion polymerization process.

BACKGROUND

Unsaturated polymers, such as the natural and synthetic rubbers are often reinforced with fibers or textiles made from organic or inorganic fibers. Examples of such reinforcing substrates include cords, fibers and textiles made of carbon, nylon, aramid, cotton, silk, rayon, wool, polyester, glass, steel and combinations of the same. The unsaturated polymers include, for example, polymers made from butadiene, styrene, isoprene, isobutylene, acrylonitrile, ethylene, propylene, chloroprene, and derivatives of the same. The applications for such reinforced polymers include tires, hoses, pressure vessels, and other such fiber-reinforced articles.

It is often a problem to achieve good adhesion between the reinforcing substrate and the unsaturated polymer matrices In the past, the adhesion problem has been addressed by use of an adhesion promoter One such adhesion promoter is a resorcinol-formaldehyde-latex (RFL) which has been widely used and modified since its invention by Charch. Its use was taught in U.S. Pat. No. 2,211,945. As the term RFL indicates, the resin is usually resorcinol-formaldehyde (RF) copolymer. However, other resins such as acrylic polymers, phenol polysulfides, phenol-formaldehyde type polymers may be used. Examples of these are taught in U.S. Pat. No. 4,472,463; Great Britain 2,147,303, and U.S. Pat. No. 4,448,813.

The latex in the RFL system is usually butadiene/styrene/vinyl pyridine polymer This polymer has been the industry standard since it was invented by Mighton, U.S. Pat. No. 2,561,215. The RFL is applied as a coating to the substrate, which is subsequently heat-treated to cure (i.e., "crosslink") the RFL resin. The unsaturated elastomer from the latex, however, remains uncured The matrix elastomer is then applied to the RFL-treated substrate and the composite is subsequently cured to form the product.

The present invention provides a heretofore unknown latex composition which acts in a resin formulation as an adhesion promoter between organic substrates and unsaturated polymers The latex can be a dispersion of a copolymer of styrene and butadiene with an amine substituted alkyl acrylate; or it can be a dispersion of a shell/core polymer where the core is a styrene/butadiene copolymer and the shell comprises a copolymer of the styrene, butadiene, and the acrylate The composition is generally formed in an emulsion copolymerization. The composition is then used in a resin/latex formulation to form a coating of reinforcing substrates and thereby provide adhesion between the reinforcing substrate and an unsaturated polymer matrix.

SUMMARY OF THE INVENTION

An adhesion promoter is provided which is the copolymerization product of styrene, butadiene and an amine substituted alkyl acrylate The amine substituted alkyl acrylate has the general Formula I

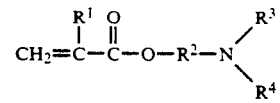

wherein $R^1$ is hydrogen, or alkyl having 1 to 4 carbon atoms, and preferably $R^1$ is hydrogen or methyl, and most preferably $R^1$ is methyl; $R^2$ is an alkyl having from 1 to 8 carbon atoms, and preferably 2 to 4 carbon atoms; and $R^3$ and $R^4$ are the same or different and are hydrogen, aliphatic having 1 to 8 carbon atoms, or aromatic or aliphatic substituted aromatic having 6 to 8 carbon atoms or together with the nitrogen are heterocyclic having 3 to 8 carbon atoms, or oxygen, sulfur, and/or halogen derivatives of the same; and preferably $R^3$ and $R^4$ are hydrogen or aliphatic having 1 to 4 carbon atoms where one may be hydrogen but not both; and most preferably $R^3$ and $R^4$ are both ethyl or $R^3$ is butyl and $R^4$ is hydrogen.

The styrene is present from about 0 to about 30 percent, preferably from about 15 to about 28 percent, and most preferably from about 20 to about 25 percent; while the butadiene is present from about 55 to about 97 percent, preferably from about 65 to about 80, and most preferably from about 69 to about 78 percent, based on the total weight of the monomers in the adhesion promoter. The amine substituted alkyl acrylate is present in an amount of about 1 to about 15, preferably from about 2 to about 12, and most preferably from about 3 to about 10 percent by weight based on the total weight of the monomers in the adhesion promoter.

The polymer is produced as a latex by emulsion polymerization. It is used in a resin/latex formulation to form a substrate coating which acts as an adhesion promoter which yields excellent adhesion as measured by ASTM test D-2138. The adhesion promoter can be used with various substrates and elastomers.

DETAILED DESCRIPTION OF THE INVENTION

The invention relates to a latex polymer which acts in a resin formulation between an unsaturated polymer matrix and a reinforcing substrate. The term "polymer" is used broadly herein to mean either a copolymer or an overpolymer or a shell/core polymer. This polymer is made from 0 to 30 percent, and preferably 15 to 28 percent, and most preferably 20 to 25 percent styrene; 55 to 97 percent, and preferably 65 to 80 percent, and most preferably 69 to 78 percent butadiene; and 1 to 15 percent, and preferably 2 to 12 percent, and most preferably 3 to 10 percent by weight of an amine substituted alkyl acrylate, all percentages, based on the total weight of the monomers.

If the polymer is a shell/core polymer, the shell is a copolymer of the amine substituted alkyl acrylate with the SBR. It is preferred that the amine substituted alkyl acrylate is present in at least 6 percent, and preferably at least about 3 percent of the monomer composition.

The amine substituted alkyl acrylate has a general formula I

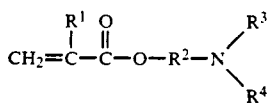

wherein $R^1$ is hydrogen, or alkyl having 1 to 4 carbon atoms, and preferably $R^1$ is hydrogen or methyl, and most preferably $R^1$ is methyl; $R^2$ is an alkyl having from 1 to 8 carbon atoms, and preferably 2 to 4 carbon atoms, and $R^3$ and $R^4$ are the same or different and are hydrogen, aliphatic having 1 to 8 carbon atoms, or aromatic or aliphatic substituted aromatic having 6 to 8 carbon atoms, or together with the nitrogen are heterocyclic having 3 to 8 carbon atoms, or oxygen sulfur, and/or halogen derivatives of the same; and preferably $R^3$ and $R^4$ are hydrogen or aliphatic having 1 to 4 carbon atoms where one may be hydrogen but not both; and most preferably $R^3$ and $R^4$ are both ethyl, or $R^3$ is butyl and $R^4$ is hydrogen. Methacrylate amino esters are preferred over acrylate amino esters, because they exhibit more favorable, higher combining ratios during copolymerization. Increasing the number of carbon atoms in the groups attached to the nitrogen atom of the acrylic esters serves to decrease the rate of hydrolysis of the ester, especially in alkaline media. This is believed to be an advantage in the invention as practiced. Specific examples of preferred acrylates include diethyl amino ethyl methacrylate, and monobutyl amino ethyl methacrylate.

The polymers are latex polymers produced by emulsion polymerization. When the random copolymer is produced, all monomers are charged at the same time to the reactor. When the shell-core polymer is produced, polymerization is first initiated with only the styrene and butadiene; then the amine substituted alkyl acrylate is added at from about 32 to about 97 percent conversion of the core polymer and preferably from about 45 to about 60 percent conversion. Suitable polymerization surfactants could be anionic surfactants including, for example, potassium oleate and sodium lauryl sulfate. Nonionic and cationic surfactants as are known in the art could also be used. Free radical catalysts such as an alkanoyl, aroyl, alkaroyl, or an aralkanoyl diperoxide, a monohydroperoxide, or an azo compound, a peroxy ester, a percarbonate, a persulfate, or any other suitable free radical-type initiator are used in an amount of from about 0.03 to about 0.3 parts per hundred parts monomer. Examples of specific initiators include potassium persulfate, sodium persulfate, ammonium persulfate, benzoyl peroxide, lauroyl peroxide, diacetyl peroxide, cumene hydroperoxide, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, t-butyl peroxyneodecanoate, dinormal propyl peroxydicarbonate, azo-bisisobutyronitrile, alpha, alpha'-azodiisobutyrate, 2,2'azo-bis-(2,4-dimethyl valeronitrile), paramethane hydroperoxide, 4-pinane hydroperoxide, and the like. Initiation may also be by UV or other radiation.

The polymerization is generally run in a 1000-3500 gallon batch reactor at a temperature of about 10° C. to about 50° C. and a pressure of about 50 psi to about 60 psi to about 100 percent conversion. Optimally, the polymerization product is a latex having a particle size of about 40 to about 140 nm, and preferably 80 to about 130 nm. The polymer is usually at a concentration of about 40 percent in the latex.

The resin/latex adhesive is prepared by mixing the adhesion promoting latex with a resin. In the preferred case, the resin is a resorcinol formaldehyde (RF) resin. It is believed that the latex polymer of the present invention will be effective in promoting adhesion in any resin formulation wherein styrene/butadiene/vinyl pyridine has been effective in promoting adhesion. Examples of other such suitable resins include acrylic polymers, phenol polysulfide polymers and copolymers from formaldehyde and hydroxy benzenes such as xylenols and cresols. The dry solids ratio of latex polymer to resorcinol-formaldehyde (L/RF ratio) is from about 1 to about 10, and preferably from about 1 to about 7, and most preferably from about 2 to about 5. The most preferable latex/resin ratio may vary depending on the reinforcing substrate, the resin, and the unsaturated polymer matrix to which it must be adhered.

The reinforcing substrate is dipped into the resin/latex adhesive and the excess is removed. The coated substrate is dried, and then cured at 150° C. to about 250° C., and preferably from about 175° to about 230° C. for 30 seconds to 10 minutes, depending on the temperature, and preferably from about 1 to about 4 minutes.

The treated substrate is then embedded into the unsaturated polymer which already contains curing agents, etc. This composite is then cured under pressure at a temperature of from about 100° to about 200° C., and preferably from about 130° to about 180° C. for 10 to about 30 minutes, depending on the temperature, and the thickness of the composite.

Suitable substrates include cords, fibers and textiles made of cotton, rayon, silk, wool, polyester such as poly(ethylene terephthalate), aliphatic and aromatic polyamides such as Nylon 66 and poly(phenylene terephthalamide), carbon, glass and steel. As is well known, some of the reinforcing substrates give best results if pretreated, before coating with the resin-latex composition of this invention, e.g., poly(ethylene terephthalate) "polyester", i.e., fibers treated with a polyisocyanate as taught in U.S. Pat. Nos. 3,307,966 and 3,226,276 which are incorporated herein by reference as if fully set forth herein. Examples of preferred substrates include those commonly used to reinforce rubber such as rayon, nylon, polyester, glass, and "Kevlar" (a poly(phenylene terephthalamide) sold by Du Pont de Nemours, Inc.)

The unsaturated polymer matrices include, for example, polymers made from butadiene, styrene, isoprene, isobutylene, acrylonitrile, ethylene/propylene, chloroprene, derivatives of the same, and other such polymers. The resin latex formulation promotes adhesion between the substrate and an unsaturated polymer matrix. By "unsaturated polymer" in this instance it is meant a polymer having unsaturation in the backbone or pendant groups and not aromaticity. This is most generally olefinic unsaturation. It is believed that the adhesion promoter of the present invention is broadly applicable for use with all sorts of polymers having olefinic unsaturation. Examples of specifically preferred unsaturated polymers include styrene/butadiene, natural rubber or polyisoprene, polychloroprene, butadiene/isobutylene copolymer, and ethylene/propylene/butadiene terpolymers The adhesion promoter of the present invention results in excellent adhesion as measured by ASTM Test D-2138.

In this test, adhesive failure can occur at two interfaces between the substrate and the RFL, and between the RFL and the elastomeric matrix. In addition, cohesive failure may occur in the substrate, the RFL or the elastomeric matrix. Traditionally, by excellent adhesion, it is meant not only that the failure load is high but also that primary failure does not occur at either interface nor does it occur cohesively in the RFL. In such a situation then, interfacial bond strengths as well as the cohesive strength of the RFL are greater than the cohesive strengths of either the substrate or the elastomeric matrix.

In all these examples, failure in the ASTM D-2138 test occurred primarily within the elastomeric matrix. This means that adhesion between the elastomer matrix and the RFL, adhesion between the textile substrate and the RFL, and the cohesive strength of the RFL are all greater than the measured and reported adhesion value.

The invention will be better understood by reference to the following examples.

EXAMPLE 1

Preparation of SBR-DEAM and SBR-VP Latices

A random terpolymer of butadiene, styrene, and diethylaminoethylmethacrylate (DEAM) was prepared using the recipe in Table I.

TABLE I

| Ingredient | Parts |
| --- | --- |
| Butadiene | 70.0 |
| Styrene | 20.0 |
| DEAM | 10.0 |
| Potassium Oleate | 5.0 |
| Potassium Hydroxide | 0.05 |
| Trisodium Phosphate ($Na_3PO_4 \cdot 12H_2O$) | 0.5 |
| Sodium Bicarbonate | 0.2 |
| Sodium Hydrosulfite ($Na_2S_2O_4$) | 0.1 |
| Dispersing Agent | 1.5 |
| t-Dodecyl Mercaptan | 0.36 |
| Sodium Persulfate | 0.35 |
| Water | 140.00 |

Aqueous stock solutions were prepared with one or more of the following ingredients: potassium oleate, potassium hydroxide, trisodium phosphate, sodium bicarbonate, sodium hydrosulfite, and sodium persulfate. All stock solutions and the water were purged with dry nitrogen gas before use.

Potassium oleate, potassium hydroxide, trisodium phosphate, sodium bicarbonate, dispersing agent, some distilled water, styrene and DEAM were all charged into the batch reactor. The reactor was sealed and the butadiene gas was introduced. Sodium hydrosulfite was added and the reactor was introduced into a constant temperature water bath at 50° C. and the contents were continuously stirred. After 10 minutes, t-dodecyl mercaptan was added, and 30 minutes later, sodium persulfate was added. After about 30 hours, 90 percent or more of the monomers had been converted to polymer. The reactor was removed from the bath and the contents (SBR-DEAM latex) were removed.

A butadiene-styrene-vinylpyridine (SBR-VP) latex was prepared using the recipe in Table I, except that 2-vinylpyridine (VP) was substituted for DEAM.

Preparation of Resorcinol-Formaldehyde-Latex (RFL)-A

RFL formulations were prepared with SBR-DEAM and SBR-VP latices using the formulation in Table II.

TABLE II

|  | Wet | Dry |
| --- | --- | --- |
| Part A |  |  |
| Resorcinol-formaldehyde resin (70%) | 14.24 | 9.97 |
| Ammonia (28%) | 28.94 | — |
| Sodium Hydroxide | 0.28 | 0.28 |
| Acrylic latex (37%) | 29.05 | 10.75 |
| Water | 145.53 | — |
| Part B |  |  |
| Latex (41%) (SBR-DEAM or SBR-VP) | 166.66 | 68.33 |
| Natural Rubber latex (62%) | 12.35 | 7.66 |
| Water | 48.51 | — |
| Part C |  |  |
| Formalin (37%) | 8.14 | 3.01 |
| Water | 31.41 | — |
| Total | 485.11 | 100.00 |

Part A was first prepared Although commercial resorcinol-formaldehyde (RF) resin was used in this case, it is well known that RF resin can be prepared in-situ by reacting resorcinol with formaldehyde. The use of the acrylic latex, to protect the SBR type latex from environmental attack, has been documented by Solomon in U.S. Pat. No. 3,968,295 which is incorporated herein by reference as if set forth herein.

Part B was then prepared The addition of natural rubber latex to the formulation is not necessary for RFLs prepared from SBR-DEAM to act as effective adhesion promoters. Part A was then added to Part B and was well mixed.

Part C was prepared and was added to the mixture of Parts A and B. The RFL was then used within 24 hours.

RFL-A was prepared using the formulation in Table II. RFL-B was prepared in a similar way to RFL-A but without the acrylic or the natural rubber latices.

Preparation of Isocyanate-Epoxide Coating (IE) Mixture

As is well known in the art, textiles made with poly(ethylene terephthalate) (PET) fibers have to be treated with an IE coating prior to RFL treatment. The IE formulation in Table III was used for this purpose.

TABLE III

| Ingredient | Parts |
| --- | --- |
| Phenol-blocked methylene bis(phenyliso-cyanate) | 3.56 |
| Adduct of glycerol and epichlorohydrin | 1.34 |
| Anionic surfactant | 0.10 |
| Water | 95.00 |

Treatment of Textiles with EI and RFL Mixtures

Nylon 6,6 (840/2 denier) tire cords were dipped into a bath containing the RFL-A mixture, the excess RFL was removed, and the cords were dried for 2 minutes at 150° C. The dried cords were then baked for 1 minute at 220° C.

Rayon (1650/3 denier) tire cords were treated with the RFL-B mixture using the above procedure.

PET (1000/2 denier) cords were first dipped into the EI mixture, the excess mixture was removed, and the cords were dried for 2 minutes at 150° C. The dried cords were then baked for 1 minute at 240° C. They were then treated with the RFL mixture as outlined above.

UNSATURATED POLYMER COMPOUNDS

The following unsaturated polymer matrices were used for the preparation of H-adhesion test samples. These polymer compounds are typical of those used in tires and other industrial rubber products.

| Ingredient | Parts |
| --- | --- |
| Compound A | |
| Natural Rubber | 60.00 |
| Styrene-butadiene Rubber | 40.00 |
| Zinc Oxide | 2.00 |
| Stearic Acid | 0.75 |
| Oil | 15.75 |
| Carbon Black | 60.00 |
| Phenol Formaldehyde Resin | 2.50 |
| Morpholinothiobenzothiazole Sulfenamide | 0.90 |
| Sulfur | 2.71 |
| Compound B | |
| Natural Rubber | 60.00 |
| Styrene-butadiene Rubber | 20.00 |
| cis-Polybutadiene | 20.00 |
| Zinc Oxide | 2.00 |
| Stearic Acid | 1.50 |
| Oil | 10.00 |
| Carbon Black | 55.00 |
| Morpholinothiobenzothiazole Sulfenamide | 1.00 |
| Sulfur | 3.56 |

Adhesion Tests

H-adhesion test samples were prepared and tested according to ASTM D-2138. The results obtained are shown in Table IV.

TABLE IV

| Fiber Polymer | Cord Denier | RFL Type | Polymer Compound | Latex Type | Adhesion Mean ± Std.Dev. |
| --- | --- | --- | --- | --- | --- |
| Rayon | 1650/3 | B | Compound A | SBR-VP | 34.3 ± 1.3 |
| Rayon | 1650/3 | B | Compound A | SBR-DEAM | 31.2 ± 1.6 |
| Nylon | 840/2 | A | Compound B | SBR-VP | 33.8 ± 3.2 |
| Nylon | 840/2 | A | Compound B | SBR-DEAM | 33.6 ± 1.5 |
| PET | 1000/2 | A | Compound A | SBR-VP | 31.5 ± 2.6 |
| PET | 1000/2 | A | Compound A | SBR-DEAM | 29.6 ± 2.7 |

These results show that SBR-DEAM latex, in an RFL formulation, provides excellent adhesion between typical tire reinforcement materials and unsaturated polymer compounds. The level of adhesion is comparable to that obtained with the SBR-VP latex that is typically used today.

EXAMPLE 2

A terpolymer of butadiene, styrene, and diethylaminoethylmethacrylate (DEAM) was prepared using the recipe in Table V.

TABLE V

| Ingredient | Parts |
| --- | --- |
| Butadiene | 70.0 |
| Styrene | 20.0 |
| DEAM | 10.0 |
| Surfactant A | 3.0 |
| Surfactant B | 2.0 |
| Potassium Hydroxide | 0.05 |
| Trisodium Phosphate | 0.5 |
| Sodium Bicarbonate | 0.2 |
| Sodium Hydrosulfite | 0.1 |
| Dispersing Agent | 1.5 |
| t-Dodecyl Mercaptan | 0.36 |
| Sodium Persulfate | 0.35 |
| Water | 132.00 |

This recipe is similar to that in Table I except that potassium oleate has been replaced by Surfactant A. Surfactant A is an ammonium salt of sulfated nonylphenoxy poly(ethyleneoxy) ethanol. This formulation uses an additional surfactant—Surfactant B, which is ammoniumlauryl sarcosinate.

The polymerization procedure is almost exactly the one described in Example 1. The only difference is that Surfactant B is added during polymerization in two steps: one-half the quantity at about 8 percent conversion and the other half after reaction is almost complete (greater than 95 percent conversion).

An RFL (RFL-C) was prepared using a formulation similar to that in Table II in Example 1, the only difference being that the only latex used was either SBRDEAM or SBR-VP. In other words, the amount of natural rubber solids in the formulation shown in Table II in Example 1 was replaced with either SBR-DEAM solids or SBR-VP solids, depending on which latex was being used in the formulation. The SBR-VP used in this experiment was manufactured by The BFGoodrich Company and is sold under the brand name Goodrite 2528x10.

1260/2 nylon 6,6 tire cords were treated with RFL-C and embedded in Compound B. 1000/2 denier PET tire cords were treated with IE and RFL-C mixtures and embedded in Compound A. The procedures are described in Example 1. Table VI shows the results of the H-adhesion test (ASTM D-2138).

TABLE VI

| Fiber Polymer | Cord Denier | RFL Type | Polymer Compound | Latex Type | Adhesion Mean ± Std.Dev. |
| --- | --- | --- | --- | --- | --- |
| PET | 1000/2 | C | Compound | SBR-VP | 25.3 ± 1.7 |

TABLE VI-continued

| Fiber Polymer | Cord Denier | RFL Type | Polymer Compound | Latex Type | Adhesion Mean ± Std.Dev. |
| --- | --- | --- | --- | --- | --- |
| PET | 1000/2 | C | Compound A | SBR-DEAM | 27.6 ± 2.1 |
| Nylon | 1260/2 | C | Compound B | SBR-VP | 38.5 ± 2.4 |
| Nylon | 1260/2 | C | Compound B | SBR-DEAM | 34.4 ± 1.5 |

These results again indicate that adhesion obtained with SBR-DEAM latex in an RFL formulation is comparable to that obtained with commercially available SBR-VP latex.

EXAMPLE 3

A core-shell SBR-DEAM latex was prepared using the formulation in Table V. The core-shell structure was created by initially introducing only 2.5 parts of DEAM into the reactor. The rest (7.5 parts) was added at about 70 percent conversion. In this case, the core and the shell are composed of SBR-DEAM polymer; the concentration of DEAM in the shell is much greater than that in the core.

Preparation of the RFL, treatment of 1600/2 PET tire cord, adhesion sample preparation and testing were all the same as in Example 2. The adhesion results obtained are shown in Table VII.

TABLE VII

| Fiber Polymer | Cord Denier | RFL Type | Polymer Compound | Latex Type | Adhesion Mean ± Std.Dev. |
| --- | --- | --- | --- | --- | --- |
| PET | 1600/2 | C | Compound A | SBR-VP | 32.9 ± 2.8 |
| PET | 1600/2 | C | Compound A | SBR-DEAM | 29.7 ± 1.3 |

These results indicate that adhesion obtained with core-shell SBR-DEAM latex, in an RFL formulation is also comparable to that obtained with SBR-VP latex.

EXAMPLE 4

A core-shell SBR-DEAM latex was prepared using a formulation similar to that in Table V; the only exceptions were that the levels of butadiene and DEAM were 72.0 and 3.69 parts respectively.

The core-shell structure was created by introducing all of the DEAM into the reactor at 49 percent conversion. Thus, the resulting latex particles are expected to contain a core of SBR polymer which is covered with a shell of SBR-DEAM polymer. Preparation of the RFL, treatment of 1600/2 PET tire cord, adhesion sample preparation and testing were all the same as in Example 2. The adhesion results obtained are shown in Table VIII.

TABLE VIII

| Fiber Polymer | Cord Denier | RFL Type | Polymer Compound | Latex Type | Adhesion Mean ± Std.Dev. |
| --- | --- | --- | --- | --- | --- |
| PET | 1600/2 | C | Compound A | SBR-VP | 32.9 ± 2.8 |
| PET | 1600/2 | C | Compound A | SBR-DEAM | 30.9 ± 3.0 |

These results indicate that adhesion obtained with core-shell SBR-DEAM latex, which contains only about 3.8 percent DEAM in the polymer is also comparable to that obtained with commercially available SBR-VP latex.

While in accordance with the Patent Statutes, the best mode and preferred embodiment has been set forth, the scope of the invention is not limited thereto, but rather by the scope of the attached claims.

What is claimed is:

1. An article comprising:
   an organic or inorganic substrate;
   an unsaturated polymer matrix; and
   a resin formulation which promotes adhesion between said substrate and said matrix, wherein said formulation comprises a resorcinol-formaldehyde resin and a polymer obtained by emulsion polymerization of:
   (a) from about 0 to about 30 percent by weight of styrene;
   (b) from about 55 to about 97 percent by weight of butadiene; and
   (c) from about 1 to about 15 percent by weight of an amine substituted alkyl acrylate having the general formula I:

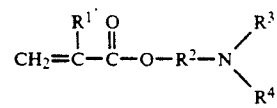

wherein $R^1$ is hydrogen or alkyl having 1 to 4 carbon atoms; $R^2$ is an alkyl having from 1 to 8 carbon atoms; and $R^3$ and $R^4$ are the same or different and are hydrogen, aliphatic group having 1 to 8 carbon atoms, or together with the nitrogen are heterocyclic having 3 to 8 carbon atoms, or oxygen, sulfur, and/or halogen derivatives of said aliphatic group;
   the percentages being based on the total weight of monomers (a), (b) and (c).

2. An article as set forth in claim 1, wherein said substrate is carbon, polyamide, cotton, silk, polyester, glass, steel, or combinations of the same.

3. An article as set forth in claim 1, wherein said unsaturated polymer matrix is a polymer made from one or more of the group consisting of butadiene, styrene, isoprene, isobutylene, acrylonitrile, ethylene, propylene, chloroprene, and derivatives of the same.

4. An article as set forth in claim 1, wherein $R^1$ is hydrogen or methyl, $R^2$ is an alkyl having from about 2 to about 4 carbon atoms, and $R^3$ and $R^4$ are hydrogen or aliphatic having from 1 to about 4 carbon atoms where one may be hydrogen but not both.

5. An article as set forth in claim 4, wherein $R^1$ is methyl, $R^2$ is ethyl, and $R^3$ and $R^4$ are ethyl or $R^3$ and $R^4$ are ethyl or $R^3$ is butyl and $R^4$ is hydrogen.

6. An article as set forth in claim 5, wherein said styrene is present from about 15 to about 28 percent by weight; said butadiene is present from about 65 to about 80 percent by weight, and said amine substituted acrylate is present from about 2 to about 12 percent by weight.

7. An article as set forth in claim 6, wherein said polymer obtained by emulsion polymerization is a shell-/core polymer having a core comprising the product of at least a portion of said styrene and at least a portion of said butadiene and said shell comprises at least a portion of said styrene, at least a portion of said butadiene and said amine substituted alkyl acrylate.

8. An article as set forth in claim 7, wherein said amine substituted alkyl acrylate is present in said shell polymer in about 3 to about 10 percent based on the total weight of said polymer obtained by emulsion polymerization.

9. An article as set forth in claim 1, wherein said amine substituted alkyl acrylate is diethyl amino monoethyl methacrylate.

10. An article as set forth in claim 1, having a dry solids ratio of from about 1 to about 7 of said polymer obtained by emulsion polymerization to said resorcinol-formaldehyde resin.

11. An article as set forth in claim 10, wherein said dry solids ratio is from about 2 to about 5 of said polymer obtained by emulsion polymerization to said resorcinol-formaldehyde resin.

* * * * *